(12) United States Patent
Swan

(10) Patent No.: US 8,786,598 B2
(45) Date of Patent: Jul. 22, 2014

(54) PIXEL-INTENSITY MODULATION TECHNIQUE FOR FRAME-SEQUENTIAL STEREO-3D DISPLAYS

(75) Inventor: Philip L. Swan, Richmond Hill (CA)

(73) Assignee: ATI Technologies, ULC, Markham, Ontario (CA)

( * ) Notice: Subject to any disclaimer, the term of this patent is extended or adjusted under 35 U.S.C. 154(b) by 829 days.

(21) Appl. No.: 12/950,753

(22) Filed: Nov. 19, 2010

(65) Prior Publication Data

US 2012/0127154 A1 May 24, 2012

(51) Int. Cl.
*G06T 13/00* (2011.01)
*G06T 15/00* (2011.01)
*H04N 13/00* (2006.01)
*H04N 13/02* (2006.01)
*H04N 13/04* (2006.01)
*G06K 9/00* (2006.01)
*G06K 9/40* (2006.01)
*G09G 3/20* (2006.01)
*G09G 5/00* (2006.01)
*G09G 5/02* (2006.01)

(52) U.S. Cl.
USPC ........... 345/419; 345/581; 345/589; 345/473; 345/475; 345/58; 348/42; 348/51; 348/54; 348/55; 348/56; 382/154; 382/274

(58) Field of Classification Search
CPC ........... G06T 5/40; G06T 5/50; G06T 7/0079; G06T 7/0097; G06T 11/001; G06T 13/00; G06T 15/00; G06T 15/50; G06T 15/503; G06T 19/00; G06T 19/20; H04N 9/646; H04N 9/77; H04N 13/00; H04N 13/0003; H04N 13/0007; H04N 13/0025; H04N 13/0037; H04N 13/0257; H04N 13/0402; H04N 13/0422
USPC ............. 345/419, 56, 58, 581, 589, 473, 475, 345/611, 616; 348/42, 46, 47, 51, 54–56, 348/607, 614, 625, 627, 630, 631; 382/154, 382/274, 275, 266–269
See application file for complete search history.

(56) References Cited

U.S. PATENT DOCUMENTS

| | | | | |
|---|---|---|---|---|
| 2009/0167639 | A1* | 7/2009 | Casner et al. | 345/58 |
| 2010/0020160 | A1* | 1/2010 | Ashbey | 348/43 |
| 2010/0238274 | A1* | 9/2010 | Kim et al. | 348/51 |

* cited by examiner

*Primary Examiner* — Ke Xiao
*Assistant Examiner* — Jed-Justin Imperial
(74) *Attorney, Agent, or Firm* — Sterne, Kessler, Goldstein & Fox P.L.L.C.

(57) ABSTRACT

Discloses herein are methods, apparatuses, and systems for preparing and displaying images in frame-sequential stereoscopic 3D. Frame-sequential stereoscopic display includes an alternating sequence of left- and right-perspective images for display. Disclosed methods include identifying pixels that modulate due to the alternating sequence of left- and right-perspective images of the frame-sequential stereoscopic display. The disclosed methods also include processing the pixels to reduce one or more residual images caused by the alternating sequence of left- and right-perspective images of the frame-sequential stereoscopic display. The disclosed methods may be implemented by a processing unit and the processing unit may be included in a system (such as, a computer or video-game console).

21 Claims, 6 Drawing Sheets

PIXEL-INTENSITY MODULATION TECHNIQUE FOR FRAME-SEQUENTIAL STEREO-3D DISPLAYS

BACKGROUND OF THE INVENTION

1. Field of the Invention

The present invention is generally directed to display techniques. More particularly, the present invention is directed to 3D display techniques and applications thereof.

2. Background

Frame-sequential stereoscopic display technology enables images to be displayed in 3D. In frame-sequential stereoscopic display, an alternating sequence of left- and right-perspective images are displayed, wherein the left-perspective images are intended to be viewed by a user's left eye and the right-perspective images are intended to be viewed by the user's right eye. If the left- and right-perspective images are successively displayed at an appropriate rate (e.g., approximately 60 Hz/perspective), the user will perceive the images as being in 3D.

Frame-sequential stereoscopic images may be provided on a display (e.g., a television or other display device) that is coupled to a device (e.g., a computer or a video-game console) having a processing unit (e.g., a central-processing unit (CPU) and/or a graphics-processing unit (GPU)). In this way, the frame-sequential stereoscopic display enables a user to, for example, watch movies and/or play video games in 3D.

Unfortunately, the quality of the frame-sequential stereoscopic display may be limited by the response time of the display. For example, if a display does not have a sufficiently high response time (which is a fairly common problem for liquid crystal displays (LCDs) in particular), then when the display is driven for frame-sequential stereoscopic 3D residual information intended for the left eye may be present in the right-perspective image and vice-versa. The residual information may appear as one or more faint ghost images. These faint ghost images may appear to the left and right of the intended image depending on the depth of the object in the 3D scene.

One potential solution for reducing the appearance of such undesirable residual images is to use 3D technologies other than frame-sequential stereoscopic display. But these other 3D technologies typically lower the perceived resolution of the images and, therefore, are undesirable.

Another potential solution for reducing the appearance of these undesirable residual images is to use techniques designed to increase the response time of a standard LCD display, such as black frame insertion. In black frame-insertion techniques, the total brightness is limited by reducing the "on time" of the pixels in the panel. But one problem with this potential solution is that the black frame-insertion techniques are designed to minimize the response time that is measured and published as a specification of the display, but these techniques are not designed to reduce residual images caused by frame-sequential stereoscopic display. Consequently, it is not clear that black frame-insertion techniques would actually work to reduce the appearance of residual images that may occur in frame-sequential stereoscopic display.

An additional potential solution for reducing the appearance of these undesirable residual images is to adjust the shuttering mechanism to mask the appearance of any residual images. But this solution is undesirable because it would cause a reduction in the perceived brightness.

Given the foregoing, what is needed are methods, apparatuses, and systems for reducing the appearance of residual images that may occur in frame-sequential stereoscopic-3D displays.

BRIEF SUMMARY OF EMBODIMENTS OF THE INVENTION

Embodiments of the present invention meet the above-described needs by providing methods, apparatuses, and systems of pixel-intensity modulation for frame-sequential, stereo-3D displays.

For example, an embodiment of the present invention provides a method for preparing images for frame-sequential stereoscopic display, the frame-sequential stereoscopic display including an alternating sequence of left- and right-perspective images for display. The method includes identifying pixels that modulate due to the alternating sequence of left- and right-perspective images of the frame-sequential stereoscopic display. The method also includes processing the pixels to reduce one or more residual images caused by the alternating sequence of left- and right-perspective images of the frame-sequential stereoscopic display.

Another embodiment of the present invention provides a processing unit for preparing images for frame-sequential stereoscopic display, the frame-sequential stereoscopic display including an alternating sequence of left- and right-perspective images for display. The processing unit is configured to identify pixels that modulate due to the alternating sequence of left- and right-perspective images of the frame-sequential stereoscopic display. The processing unit is also configured to process the pixels to reduce one or more residual images caused by the alternating sequence of left- and right-perspective images of the frame-sequential stereoscopic display. In an embodiment, the processing unit may be embodied in software, using, for example, a hardware-description language.

A further embodiment of the present invention provides a system, comprising a processing unit and a display. The processing unit is configured to prepare images for frame-sequential stereoscopic display. The frame-sequential stereoscopic display includes an alternating sequence of left- and right-perspective images for display. In order to prepare the images for frame-sequential stereoscopic display, the processing unit is configured to identify pixels that modulate due to the alternating sequence of left- and right-perspective images of the frame-sequential stereoscopic display and further configured to process the pixels to reduce one or more residual images caused by the alternating sequence of left- and right-perspective images of the frame-sequential stereoscopic display. The display is configured to display the images prepared by the processing unit.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
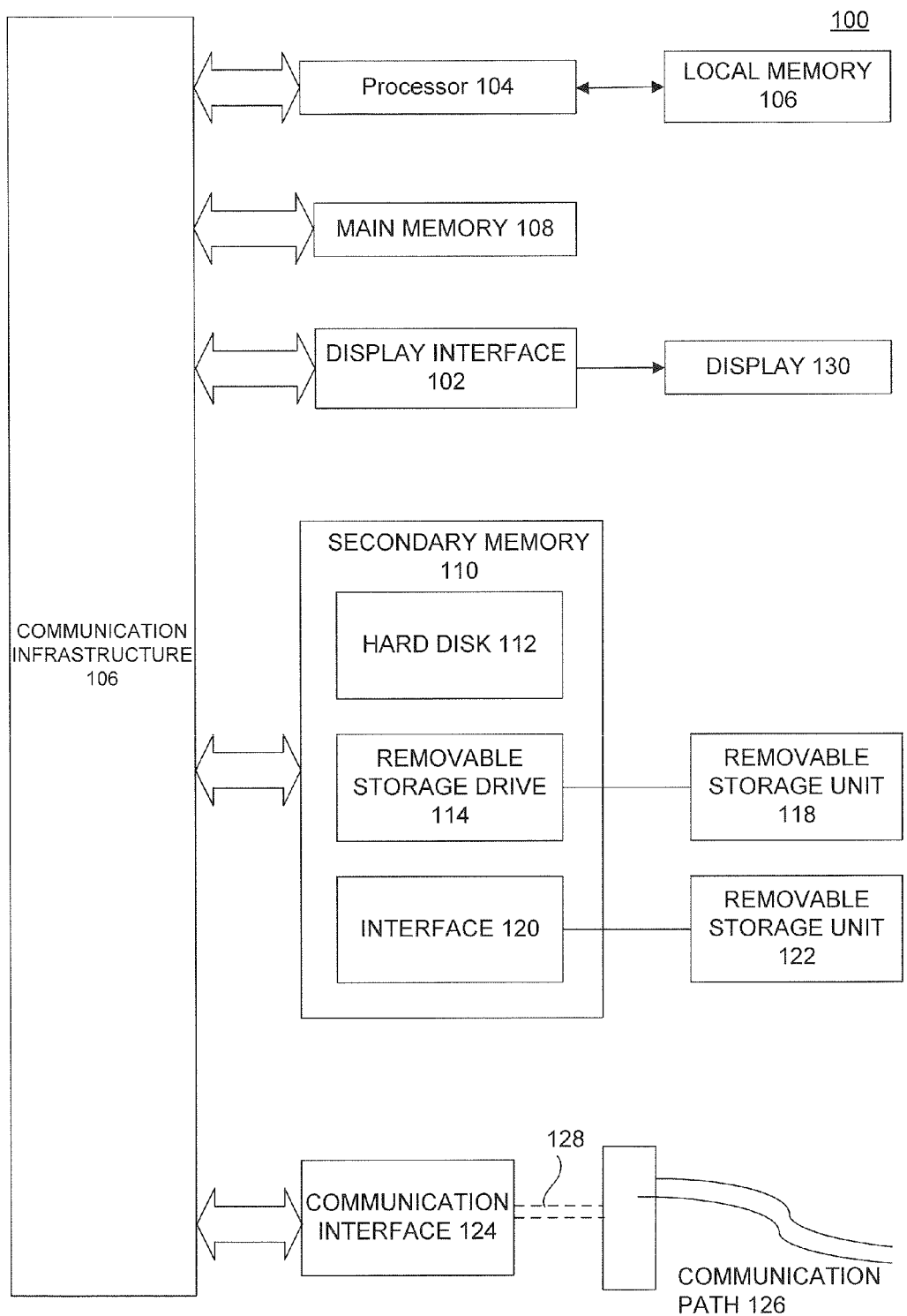
FIG. 1 illustrates an example computing system for processing and/or displaying frame-sequential stereoscopic images in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Overview

Embodiments of the present invention provide methods, apparatuses, and systems of pixel-intensity modulation for frame-sequential, stereo-3D displays. In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For example, an embodiment of the present invention is directed to a device that applies different settings to an overdrive technology or black frame-insertion technology based on detection of the frame-sequential stereo 3D display (FSS3DD) use case.

Another embodiment of the present invention is directed to reducing undesirable residual images that may occur due to frame-sequential stereoscopic display. According to this embodiment, different types of modulating pixels are identified and then processed to reduce the undesirable residual images.

Specifically, at least two different types of pixels in a display raster are identified: (i) pixels that modulate (e.g. flash on and off) due to frame-sequential stereo 3D display, referred to herein as "static modulators"; and (ii) pixels that modulate due to motion in the scene, referred to herein as "dynamic modulators". The static (or semi-static) modulators are pixels that the viewer can easily track since, from the viewer's perspective, these pixels are non-moving or slowly moving objects. As such, these pixels will likely be under more scrutiny from a quality perspective. The dynamic modulators, on the other hand, will typically receive less scrutiny from the average user because the dynamic modulators will typically move more rapidly from the user's perspective. Thus, the dynamic modulators will appear more fleeting than static modulators.

After identifying the static modulators, these pixels are processed to reduce the appearance of residual images. While the left- and right-perspective versions of a static object may appear substantially identical to a viewer, residual images that occur due to insufficient response time of the display will be different. What each eye actually perceives is the sum of the intended images and the residual images. The static modulators can be processed to reduce the appearance of the residual images. One example processing technique disclosed in more detail below is to use multiple frames for each left-perspective image and each right-perspective image to smooth transition between successive left- and right-perspective images.

Before describing these and other embodiments of the present invention in more detail, however, it is first helpful to describe example computing hardware (e.g., processing units and systems) in which embodiments of the present invention may be implemented.

II. Example Computing Hardware

Embodiments of the present invention are directed to computing hardware configured to reduce residual images that may occur in frame-sequential stereoscopic display. The computing hardware may comprise, for example, a computer, a hand-held computing device, a video-game console, DVD, Blu-Ray™ or other media player, a television, or the like. An example of a computing system 100 is shown in FIG. 1.

Computer system 100 includes one or more processors, such as processor 104. Processor 104 may be a general-purpose processor (such as, a CPU) or a special-purpose processor (such as, a GPU). Processor 104 is connected to a communication infrastructure 106 (e.g., a communications bus, cross-over bar, or network).

Computer system 100 includes a display interface 102 that forwards graphics, text, and other data from communication infrastructure 106 (or from a frame buffer not shown) for display on display unit 130.

Figure 2:
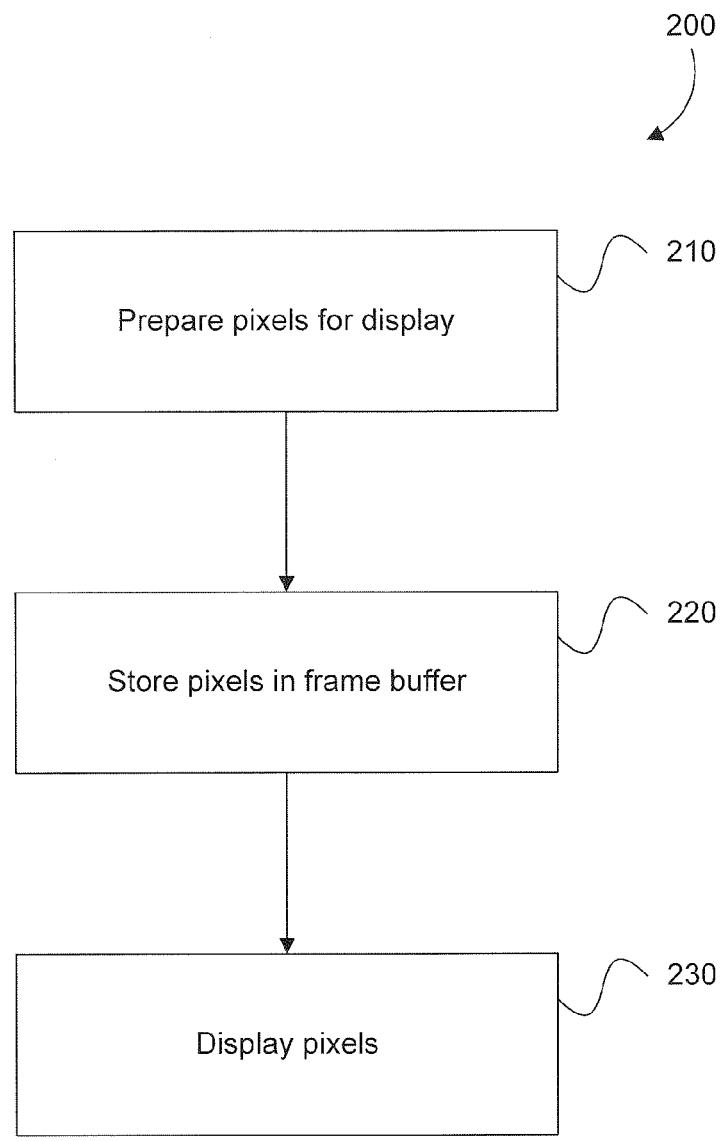
FIG. 2 illustrates an example method for preparing and displaying pixels.

For example, FIG. 2 illustrates an example method 200 for providing pixels to display unit 130. In a step 210, pixels are prepared for display. The preparation of the pixels may include, for example, techniques for reducing residual images caused by frame-sequential stereoscopic display as described herein. In an embodiment, processor 104 executes one or more computer programs to implement these techniques for reducing the residual images. In a step 220, the pixels are stored in the frame buffer. In a step 230, the pixels are provided for display. For example, display interface 102 may forward the pixels to display unit 130.

Referring again to FIG. 1, computer system 100 also includes a main memory 108, preferably random access memory (RAM), and may also include a secondary memory 110. The secondary memory 110 may include, for example, a hard disk drive 112 and/or a removable storage drive 114, representing a floppy disk drive, a magnetic tape drive, an optical disk drive, etc. The removable storage drive 114 reads from and/or writes to a removable storage unit 118 in a well known manner. Removable storage unit 118 represents a floppy disk, magnetic tape, optical disk, etc. which is read by and written to by removable storage drive 114. As will be appreciated, the removable storage unit 118 includes a computer usable storage medium having stored therein computer software and/or data.

In alternative embodiments, secondary memory 110 may include other similar devices for allowing computer programs or other instructions to be loaded into computer system 100. Such devices may include, for example, a removable storage unit 122 and an interface 120. Examples of such may include a program cartridge and cartridge interface (such as that found in video game devices), a removable memory chip (such as an erasable programmable read only memory (EPROM), or programmable read only memory (PROM)) and associated socket, and other removable storage units 122 and interfaces 120, which allow software and data to be transferred from the removable storage unit 122 to computer system 100.

Computer system 100 may also include a communications interface 124. Communications interface 124 allows software and data to be transferred between computer system 100 and external devices. Examples of communications interface 124 may include a modem, a network interface (such as an Ethernet card), a communications port, a Personal Computer Memory Card International Association (PCMCIA) slot and card, etc. Software and data transferred via communications interface 124 are in the form of signals 128 which may be electronic, electromagnetic, optical or other signals capable of being received by communications interface 124. These signals 128 are provided to communications interface 124 via a communications path (e.g., channel) 126. This channel 126 carries signals 128 and may be implemented using wire or cable, fiber optics, a telephone line, a cellular link, an radio frequency (RF) link and other communications channels.

In this document, the term "computer-readable storage medium" is used to generally refer to media such as removable storage drive 114, a hard disk installed in hard disk drive 112, or other similar storage devices. These computer-program products provide software to computer system 100.

Computer programs (also referred to as computer control logic) are stored in main memory 108 and/or secondary memory 110. The computer programs may comprise end-user application programs, application-programming interfaces (APIs), a driver of processor 104, or other types of computer programs. In an embodiment, the computer programs may be stored in a computer-program product and loaded into computer system 100 using removable storage drive 114, hard drive 112 or communications interface 124. Computer programs may also be received via communications interface 124.

These computer programs, when executed, enable computer system 100 to perform the features of embodiments of the present invention, as discussed herein. For example, the computer programs, when executed, enable processor 104 to implement methods of embodiments of the present invention—such as, an example method 300 described below with reference to FIG. 3.

III. Example Methods

Figure 3:
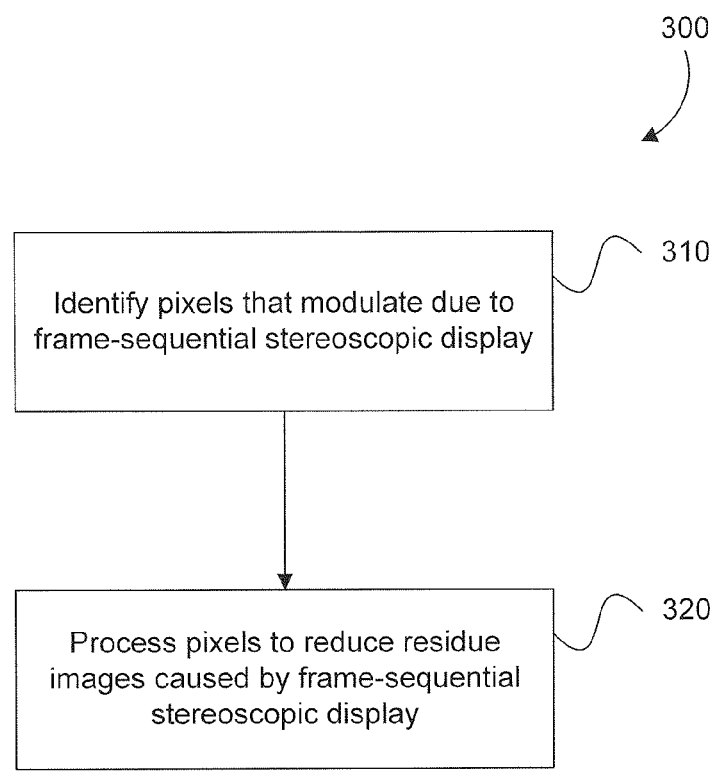
FIG. 3 illustrates an example method preparing images for frame-sequential stereoscopic display in accordance with an embodiment of the present invention.

FIG. 3 illustrates an example method 300 for reducing residual images occurring in a frame-sequential stereoscopic display. Referring to FIG. 3, a step 310 of method 300 includes identifying pixels that modulate due to frame-sequential stereoscopic display, and a step 320 includes processing pixels to reduce residual images caused by the frame-sequential stereoscopic display. A processing unit (such as, processor 104) may execute program code to implement steps 310 and 320. Each of these steps is described in more detail below.

Figure 4:
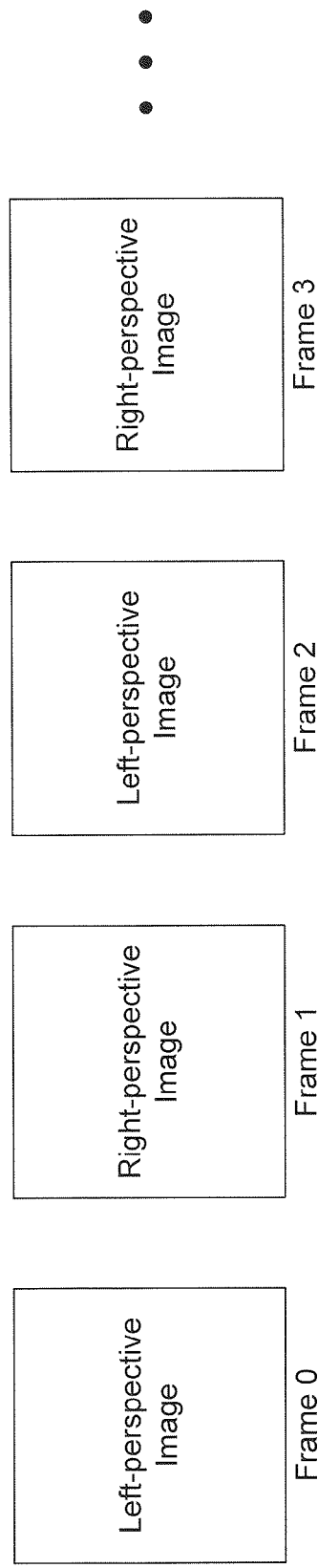
FIG. 4 illustrates a sequence of left- and right-perspective images for frame-sequential stereoscopic display.

A. Step 310—Identifying Pixels that Modulate Due to Frame-Sequential Stereoscopic Display As set forth above and as illustrated in FIG. 4, frame-sequential stereoscopic-3D display technology presents an alternating sequence of left- and right-perspective images. In such stereoscopic-3D displays, a pixel that is intended to be projected onto a viewer's retina will likely not be located at the same position in the left- and right-perspective images of the source raster (even though such a pixel represents the same object/spatial location to be displayed to the user). Because pixels projected onto the viewer's retina may not correspond to the same pixels in the left- and right-perspective images, pixels may appear to modulate (e.g., flash on and off) due to the alternating sequence of left- and right-perspective images—i.e., these pixels will be static modulators as defined above.

In addition to static modulators, pixels may modulate due to motion of an object depicted in a scene. That is, in addition to static modulators, there may also be dynamic modulators as defined above.

The static (or semi-static) modulators are pixels that the viewer can easily track since, from the viewer's perspective, these pixels are non-moving or slowly moving objects. As such, these pixels will likely be under more scrutiny from a quality perspective. The dynamic modulators, on the other hand, will typically receive less scrutiny from the average user because the dynamic modulators will typically move more rapidly from the user's perspective. Thus, the dynamic modulators will appear more fleeting than static modulators.

In order to identify pixels that modulate due to frame-sequential stereoscopic display, embodiments of the present invention are configured to identify, track, segment, and match up objects that are common to the left- and right-perspective images. For example, a plurality of left-perspective images (such as, for example, frames 0 and 2 of FIG. 4) may be compared to a plurality of right-perspective images (such as, for example, frames 1 and 3 of FIG. 4) to identify the static modulators (i.e., the pixels that modulate due to frame-sequential stereoscopic display) and the dynamic modulators (i.e., the pixels that modulate due to motion in a scene depicted by the images).

Figure 5:
FIG. 5 illustrates successive frames that may be processed in accordance with embodiments of the present invention.

Existing techniques—such as, sum of absolute differences ("SAD")—may be used in accordance with embodiments of the present invention to identify the static modulators and dynamic modulators. The SAD technique, for example, adds up the absolute differences between pixels of different frames—such as, for example, the left- and right-perspective images illustrated in FIGS. 4 and 5. With reference to the example pixels illustrated in FIG. 5, the sum of absolute differences technique may be represented mathematically as follows:

Error! Objects cannot be created from editing field codes. wherein L represents the left-perspective image, R represents the right-perspective image, and the subscripts represent the pixel number of the respective left- and right-perspective images. The comparison may be done at each location or using phase-plane correlation, as is well known. Additional techniques, known to persons skilled in the relevant art(s), may be used in accordance with embodiments of the present invention to identify the static modulators and the dynamic modulators. Examples of these additional techniques are discussed in many publications, including Gonzalez, "Digital Image Processing, Pearson Prentice Hall, Upper Saddle River, N.J., pp. 861-906, 2008 and in U.S. Pat. No. 7,197,074 entitled "Phase Plane Correlation Motion Vector Determination Method, the entirety of each of which is hereby incorporated by reference herein.

After identifying the pixels that modulate due to the frame-sequential stereoscopic display, embodiments of the present invention are configured to process these pixels to reduce residual images caused by the frame-sequential stereoscopic display, in accordance with step 320 of FIG. 3 and as described in more detail below.

B. Step 320—Processing Pixels to Reduce Residual Images Caused by Frame-Sequential Stereoscopic Display While the left- and right-perspective images of a static object may appear (substantially) identical to a viewer, residual images that occur due to insufficient response time of the display will be different. The "response time" refers to the rise and fall time associated with a particular pixel. For example, although a 120 Hz display may be able to process and display new frames every $\frac{1}{120}$th of a second, if a pixel's response time is $\frac{1}{120}$th of a second or longer, the pixel may not have sufficient time to switch, for example, from on to off during a single frame. As a result, the pixel may remain slightly on for a portion of a following frame, causing one or more residual images. Each of a viewer's eyes will observe the sum of the intended images and the residual images. Using the knowledge of the pixels that modulate due to frame-sequential stereoscopic display (identified in step 310) and knowledge about the response characteristics of the display and shuttering mechanism, the pixels may be processed in accordance with step 320 to reduce the perceived affect of the residual images.

Figure 6:
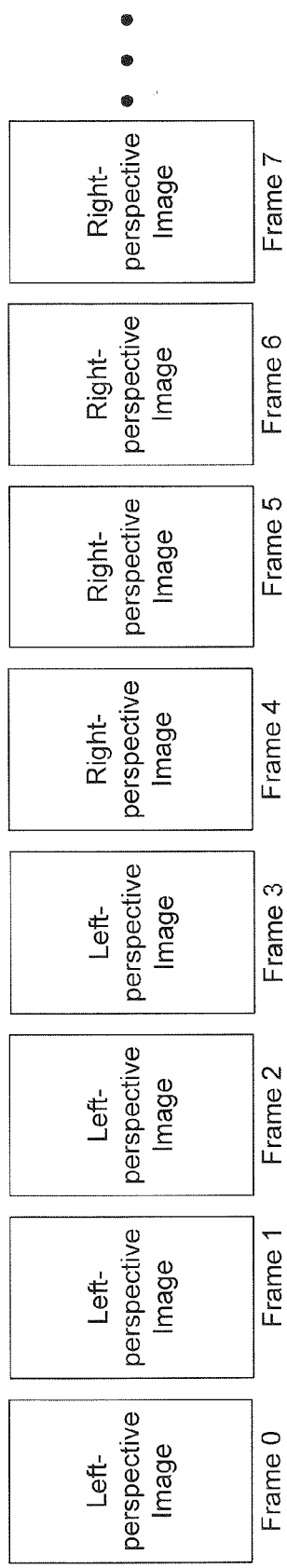
FIG. 6 illustrates an alternating sequence of left- and right-perspective images for frame-sequential stereoscopic display in accordance with an embodiment of the present invention, wherein the left-perspective images are displayed for four consecutive frames and then the right-perspective images are displayed for four consecutive frames.

One approach for reducing the perceived affect of the residual images is to alternate between a plurality of left-perspective images and a plurality of right-perspective images. For example, rather than simply alternating between a single left-perspective image and a single right-perspective image as illustrated in FIG. 4, the frame-sequential stereoscopic display in accordance with an embodiment of the present invention may alternate between a string of four left-perspective images and a string of four right-perspective images as illustrated in FIG. 6. This technique may be implemented, for example, by using a 240 Hz LCD panel with a 60 Hz shuttering mechanism, wherein the left-perspective images are displayed for four consecutive frames and then the right-perspective images are displayed for four consecutive frames and so on. To reduce the affects of the residual images, frames at the boundary between the left- and right-perspective images (e.g., frames 0—being the boundary between a previous and not illustrated right-perspective image and frame 0 being a left-perspective image—and frame 3—being a boundary between the left perspective image of frame 3 and the right-perspective image illustrated in frame 4—of FIG. 6) may be set with pixels that are closer to the average pixel brightness levels for the temporally sequential left- and right-perspective images. In this way, less of a transition occurs at the left/right perspective image change and, as a result, less residual images bleed from the left-perspective image to the right-perspective image and vice versa. To compensate for the temporally averaged frames, frames removed from the boundary (e.g., frames 1 and 2) overemphasize the differences.

This technique is illustrated in Table 1 below, wherein the numbers in the right-hand column represent a given pixel's intensity levels versus time. Referring to Table 1, the first row illustrates an alternating sequence of left- and right-perspective images, wherein the left-perspective image is displayed for four consecutive frames and the right-perspective image is displayed for four consecutive images as illustrated in the right-hand column. The second row illustrates the desired ideal image if the pixels could change instantaneously. The third row illustrates the actual image as a result of the slow response time of a typical LCD panel. The fourth row illustrates an embodiment of the present in which the temporally modulating portion of the pixel's intensity is moved out of the transitional frames that bracket the left- and right-perspective transition points and into the middle of the frames. For example, rather than displaying a pixel's intensity as 3333 (as in the ideal image for the string of left-perspective images), according to this embodiment the pixel's intensity is modified to be 5115, which averages out to 3333. Similarly, rather than displaying a pixel's intensity as 7777 (as in the ideal image for the string of right-perspective images), according to this embodiment the pixel's intensity is modified to 5995, which averages out to 7777. Moving energy into the middle of the frames as illustrated, for example, in Table 1 makes the whole frame sequential system more tolerant of transitions that are not perfectly crisp due to limitations in either the panel or the shuttering mechanism.

TABLE 1

| Left/Right | LLLLRRRRLLLLRRRRLLLLRRRRLLLLRRRR |
|---|---|
| Ideal Image (instant response time) | 33337777333377773333777733337777 |
| Actual Image (normal response time) | 33336777433367774333677743336777 |
| Modified Pixel Intensities | 51155995511559955115599551155995 |

It should be noted that the amount of energy that can be moved into the middle frames depends on the pixel intensity in the region and the dynamic range of the display. The implementation will be more robust if the amount of energy moved does not change too abruptly in either spatial or temporal dimensions. It is well known in the art that transitioning mechanisms are needed to insure that the signal-processing approach is spatially and temporally consistent within a neighborhood and that transitions must be smoothed to achieve the right balance between slow to respond and too abrupt. For example, a calculation can be done on a per pixel basis to determine how much energy can be moved at the borders between a given frame and one of its temporal neighbors. In the example above, it can be determined that it is possible to convert "3333" to "5115." But if the maximum pixel value were 8, then it would not be possible to change "7777" to "5995" since the 9's would be illegal values. In this case, the "7777" can be changed to "6886" since that latter sequence has the same average but does not create an illegal value. The amount of energy moved could be expressed for a single pixel element (or pel) by:

IF $P_n > P_{n-1}$ THEN
    FullEnergyAdjustment$_{01}$ = $(P_n - P_{n-1})/2$
    MaxEnergyAdjustment$_{01}$ = maxvalue − $P_n$
Else
    FullEnergyAdjustment$_{01}$ = $(P_{n-1} - P_n)/2$
    MaxEnergyAdjustment$_{01}$ = $P_n$ − minvalue
ENDIF If the repeated images 0 through 3 are labeled, then the EnergyAdjustment values above correspond to images 0 and 1. Using similar math, EnergyAdjustment values can be computed for images 2 and 3.

Before applying these values it is advisable to filter them spatially, temporally, or both. It may also be advisable to filter them so that "per pel" adjustments are internally consistent within a pixel. If an adjustment on a given pel of a pixel (such as, a Red pel) is not compatible with the adjustment on a different pel of the pixel (such as, a Green pel), this may generate a perceptible error (such as, a color error). It will also be beneficial to consider the transfer curves that convert pel values to perceived light output from the display device. Generally, there is a most-appropriate "gamma space" in which to make these kinds of adjustments in any system. Whether values are converted into a more-appropriate gamma space before applying the adjustments described in the invention is an implementation decision that would affect the cost versus quality of the result.

FullEnergyAdjustment and MaxEnergyAdjustment can be converted to an LimitedEnergyAdjustment value using a "min(a, b)" operation. Alternately, the "hard stop" of the min operator can be avoided by using a function or transfer curve that limits FullEnergyAdjustment in a more gradual way.

After filtering LimitedEnergyAdjustment, the limiting function should be applied again to insure that none of the filtered values would generate illegal output values. The filtered and limited EnergyAdjustment values can then be applied to the pixels in the images to create the redistribution of energy affect described in the above example.

In addition to reducing the affects of residual images due to frame-sequential stereoscopic display, an embodiment of the present invention provides for temporal energy redistribution. This embodiment modifies the dynamics of the shuttering mechanism to improve the perceived display brightness or to provide the same perceived brightness with less power. Conventional shuttering mechanisms are typically tuned to balance response time related artifacts against loss of brightness. For example, according to a conventional shuttering mechanism, the shutter may be open for only 30% for the time for each eye resulting in 70% of the light energy being masked. In contrast, according to an embodiment of the present invention, the temporal AC component of brightness is concentrated into fewer frames, allowing each eye's shutter to be open a higher percentage of the time. This results in a higher perceived brightness per watt consumed by the backlight. The timing of the shuttering mechanism may also be adjusted based on how well the content lends itself to the temporal energy redistribution process.

A person skilled in the relevant art(s) will appreciate that other LCD overdrive type technologies can be adapted to 3D stereo displays in accordance with embodiments of the present invention based on the identification of the static modulators.

IV. Example Software Implementations

In addition to hardware implementations of processor 104, this processor may also be embodied in software disposed, for example, in a computer-readable medium configured to store the software (e.g., a computer-readable program code). The program code enables embodiments of the present invention, including (i) the functions disclosed herein (such as, method 300 of FIG. 3), (ii) the fabrication of the systems and techniques disclosed herein (such as, the fabrication of processor 104), or (iii) a combination of the functions and fabrication of the systems and techniques disclosed herein.

This can be accomplished, for example, through the use of general-programming languages (such as C or C++), hardware-description languages (HDL) including Verilog HDL, VHDL, Altera HDL (AHDL) and so on, or other available programming and/or schematic-capture tools (such as, circuit-capture tools). The program code can be disposed in any known computer-readable medium including semiconductor, magnetic disk, or optical disk (such as, CD-ROM, DVD-ROM). As such, the code can be transmitted over communication networks including the Internet and internets. It is understood that the functions accomplished and/or structure provided by the systems and techniques described above can be represented in a core (such as a GPU core) that is embodied in program code and may be transformed to hardware as part of the production of integrated circuits.

V. Conclusion

Disclosed above are methods, apparatuses, and systems of pixel-intensity modulation for frame-sequential, stereo-3D displays according to embodiments of the present invention. It is to be appreciated that the Detailed Description section, and not the Summary and Abstract sections, is intended to be used to interpret the following claims. The Summary and Abstract sections may set forth one or more—but not all—exemplary embodiments of the present invention as contemplated by the inventor(s), and thus, are not intended to limit the present invention and the appended claims in any way.

What is claimed is:

1. A method, comprising:
arranging alternating first-perspective and second-perspective images for frame-sequential stereoscopic display into a sequence comprising a first string of multiple first-perspective images and a second string of multiple second-perspective images for display;
altering a pixel intensity of a first boundary image in the first string, wherein the first boundary image is next to a boundary between the first string and the second string, such that the pixel intensity of the first boundary image is closer to a pixel intensity of a second boundary image in the second string, wherein the second boundary image is next to the boundary between the first string and the second string; and
adjusting a pixel intensity of a second image in the first string such that an average pixel intensity of images in the first string remains substantially the same.

2. The method of claim 1, wherein the altering comprises reducing the pixel intensity of the first boundary image in the first string, and the adjusting comprises raising the pixel intensity of the second image in the first string.

3. The method of claim 1, wherein the altering comprises raising the pixel intensity of the first boundary image in the first string, and the adjusting comprises reducing the pixel intensity of the second image in the first string.

4. The method of claim 1, further comprising:
adjusting the rate at which the first-perspective and second-perspective images are alternated to concentrate brightness of the images in fewer frames.

5. A processing unit configured to perform operations comprising:
arrange alternating first-perspective and second-perspective images for frame-sequential stereoscopic display into a sequence comprising a first string of multiple first-perspective images and a second string of multiple second-perspective images for display;
alter a pixel intensity of a first boundary image in the first string, wherein the first boundary image is next to a boundary between the first string and the second string, such that the pixel intensity of the first boundary image is closer to a pixel intensity of a second boundary image in the second string, wherein the second boundary image is next to the boundary between the first string and the second string; and adjust a pixel intensity of a second image in the first string such that an average pixel intensity of images in the first string remains substantially the same.

6. The processing unit of claim 5, wherein the processing unit is further configured to alter the pixel intensity of the first boundary image by reducing the pixel intensity of the first boundary image in the first string and adjust the pixel intensity of the second image by raising the pixel intensity of the second image in the first string.

7. The processing unit of claim 5, wherein the processing unit is further configured to alter the pixel intensity of the first boundary image by raising the pixel intensity of the first boundary image in the first string and adjust the pixel intensity of the second image by reducing the pixel intensity of the second image in the first string.

8. The processing unit of claim 5, wherein the processing unit is further configured to adjust the rate at which the first-perspective and second-perspective images are alternated to concentrate brightness of the images in fewer frames.

9. The processing unit of claim 5, wherein the processing unit comprises a graphics processing unit.

10. The processing unit of claim 5, wherein the processing unit is further configured to
   determine whether the images are organized for frame-sequential stereoscopic display; and
   provide the images for display on a display device, wherein the images are displayed in stereoscopic 3D when the images are organized for frame-sequential stereoscopic display, and wherein the images are displayed in 2D when the images are not organized for frame-sequential stereoscopic display.

11. A system, comprising:
   a processing unit configured to prepare images for frame-sequential stereoscopic display, wherein the preparation of the images for frame-sequential stereoscopic display includes
      arranging alternating first-perspective and second-perspective images for the frame-sequential stereoscopic display into a sequence comprising a first string of multiple first-perspective images and a second string of multiple second-perspective images for display,
      altering a pixel intensity of a first boundary image in the first string, wherein the first boundary image is next to a boundary between the first string and the second string, such that the pixel intensity of the first boundary image is closer to a pixel intensity of a second boundary image in the second string, wherein the second boundary image is next to the boundary between the first string and the second string, and
      adjusting a pixel intensity of a second image in the first string such that an average pixel intensity of images in the first string remains substantially the same; and
   a display configured to display the images prepared by the processing unit.

12. The system of claim 11, wherein the processing unit is further configured to alter the pixel intensity of the first boundary image by reducing the pixel intensity of the first boundary image in the first string and adjust the pixel intensity of the second image by raising the pixel intensity of the second image in the first string.

13. The system of claim 11, wherein the processing unit is further configured to alter the pixel intensity of the first boundary image by raising the pixel intensity of the first boundary image in the first string and adjust the pixel intensity of the second image by reducing the pixel intensity of the second image in the first string.

14. The system of claim 11, wherein the multiple images are refreshed at a rate of approximately 240 Hz and the first string and the second string are alternated at a rate of approximately 60 Hz.

15. The system of claim 11, wherein the first string and the second string each include four images.

16. The system of claim 11, wherein the processing unit is further configured to adjust the first-perspective and second-perspective images are alternated to concentrate brightness of the images in fewer frames.

17. The system of claim 11, wherein the processing unit comprises a graphics processing unit.

18. The system of claim 11, wherein the processing unit is further configured to determine whether the images are organized for frame-sequential stereoscopic display and provide the images for display on a display device, wherein the images are displayed in stereoscopic 3D when the images are organized for frame-sequential stereoscopic display, and wherein the images are displayed in 2D when the images are not organized for frame-sequential stereoscopic display.

19. A computer-program product comprising a non-transitory computer-readable storage medium containing instructions that, if executed on a computing device, define a processing unit for preparing images for frame-sequential stereoscopic display, wherein the processing unit is configured to:
   arrange alternating first-perspective and second-perspective images for the frame-sequential stereoscopic display into a sequence comprising a first string of multiple first-perspective images and a second string of multiple second-perspective images for display;
   alter a pixel intensity of a first boundary image in the first string, wherein the first boundary image is next to a boundary between the first string and the second string, such that the pixel intensity of the first boundary image is closer to a pixel intensity of a second boundary image in the second string, wherein the second boundary image is next to the boundary between the first string and the second string; and
   adjust a pixel intensity of a second image in the first string such that an average pixel intensity of images in the first string remains substantially the same.

20. The computer-program product of claim 19, wherein the processing unit is further configured to alter the pixel intensity of the first boundary image by reducing the pixel intensity of the first boundary image in the first string and adjust the pixel intensity of the second image by raising the pixel intensity of the second image in the first string.

21. The computer-program product of claim 19, wherein the processing unit is further configured to alter the pixel intensity of the first boundary image by raising the pixel intensity of the first boundary image in the first string and adjust the pixel intensity of the second image by reducing the pixel intensity of the second image in the first string.

* * * * *

UNITED STATES PATENT AND TRADEMARK OFFICE
CERTIFICATE OF CORRECTION

| | | |
|---|---|---|
| PATENT NO. | : 8,786,598 B2 | Page 1 of 1 |
| APPLICATION NO. | : 12/950753 | |
| DATED | : July 22, 2014 | |
| INVENTOR(S) | : Swan | |

It is certified that error appears in the above-identified patent and that said Letters Patent is hereby corrected as shown below:

In the Claims

<u>Column 12</u>

Line 14, Claim 16 please replace "adjust the first-perspective" with --adjust the rate at which the first-perspective--.

Signed and Sealed this
Seventh Day of October, 2014

Michelle K. Lee
*Deputy Director of the United States Patent and Trademark Office*